United States Patent
Kawan

(10) Patent No.: US 10,078,834 B2
(45) Date of Patent: Sep. 18, 2018

(54) METHOD AND SYSTEM OF CONTACTLESS INTERFACING FOR SMART CARD BANKING

(75) Inventor: Joseph C. Kawan, Hollywood, CA (US)

(73) Assignee: Citicorp Credit Services, Inc. (USA), Long Island City, NY (US)

( * ) Notice: Subject to any disclaimer, the term of this patent is extended or adjusted under 35 U.S.C. 154(b) by 0 days.

(21) Appl. No.: 13/073,375

(22) Filed: Mar. 28, 2011

(65) Prior Publication Data

US 2011/0173121 A1 Jul. 14, 2011

Related U.S. Application Data

(63) Continuation of application No. 09/238,995, filed on Jan. 28, 1999, now Pat. No. 8,346,663.
(Continued)

(51) Int. Cl.
*G06Q 20/34* (2012.01)
*G06Q 20/10* (2012.01)
(Continued)

(52) U.S. Cl.
CPC .......... *G06Q 20/352* (2013.01); *G06Q 20/10* (2013.01); *G06Q 20/105* (2013.01);
(Continued)

(58) Field of Classification Search
CPC ......... G06Q 40/00; G06Q 30/02; G06Q 20/00
(Continued)

(56) References Cited

U.S. PATENT DOCUMENTS

| | | | |
|---|---|---|---|
| 4,454,414 A | 6/1984 | Benton | 705/41 |
| 4,582,985 A | 4/1986 | Lofberg | 235/380 |

(Continued)

FOREIGN PATENT DOCUMENTS

| | | | |
|---|---|---|---|
| WO | WO 95/35546 | 12/1995 | G06Q 20/00 |
| WO | WO 97/45814 | 12/1997 | G06Q 20/00 |

(Continued)

OTHER PUBLICATIONS

European Search Report for Application No. EP99101544, 5 pp., dated Sep. 17, 2003.

*Primary Examiner* — Daniel S Felten
(74) *Attorney, Agent, or Firm* — Eric L. Sophir; Dentons US LLP

(57) ABSTRACT

A method and system of smart card banking utilizes a contactless communication interface, such as infrared or a wireless or radio frequency interface, including, for example, a proximity interface. A contactless communication is initiated for a smart card user between a smart card application and the on-line system of a financial institution, such as a bank, the system verifies authorization for the communication, the information is communicated for the user to the on-line system. The contactless communication is initiated, and the information is communicated, for example, between a contactless interface transceiver of a personal data assistant, into which the smart card is inserted, and the contactless interface transceiver of an on-line terminal. Alternatively, the contactless communication is initiated, and the information is communicated between a contactless interface transceiver of the smart card and the contactless interface transceiver of the terminal.

21 Claims, 7 Drawing Sheets

Related U.S. Application Data

(60) Provisional application No. 60/073,091, filed on Jan. 30, 1998.

(51) Int. Cl.
*G07F 7/08* (2006.01)
*G07F 7/10* (2006.01)
*G07F 19/00* (2006.01)

(52) U.S. Cl.
CPC ......... *G06Q 20/1085* (2013.01); *G06Q 20/32* (2013.01); *G06Q 20/327* (2013.01); *G06Q 20/3226* (2013.01); *G06Q 20/341* (2013.01); *G06Q 20/40* (2013.01); *G06Q 20/40145* (2013.01); *G07F 7/0886* (2013.01); *G07F 7/1008* (2013.01); *G07F 7/1025* (2013.01); *G07F 19/20* (2013.01); *G07F 19/201* (2013.01); *G07F 19/202* (2013.01)

(58) Field of Classification Search
USPC ............... 705/35; 235/379, 380; 709/229
See application file for complete search history.

(56) References Cited

U.S. PATENT DOCUMENTS

| | | | |
|---|---|---|---|
| 4,831,647 A | 5/1989 | D'Avello et al. | |
| 5,221,838 A * | 6/1993 | Gutman et al. | 235/379 |
| 5,461,217 A | 10/1995 | Claus | 235/380 |
| 5,563,393 A | 10/1996 | Coutts | 235/379 |
| 5,585,617 A | 12/1996 | Ohbuchi et al. | 235/491 |
| 5,590,038 A | 12/1996 | Pitroda | 705/41 |
| 5,603,078 A | 2/1997 | Henderson et al. | |
| 5,649,115 A | 7/1997 | Schrader et al. | |
| 5,748,737 A * | 5/1998 | Daggar | 705/41 |
| 5,789,733 A | 8/1998 | Jachimowicz et al. | 235/492 |
| 5,831,547 A | 11/1998 | Ohtsuki et al. | 340/825.54 |
| 5,867,153 A | 2/1999 | Grandcolas et al. | |
| 5,883,810 A | 3/1999 | Franklin et al. | 364/479.02 |
| 5,929,414 A | 7/1999 | Saitoh | 235/380 |
| 5,943,624 A | 8/1999 | Fox et al. | 455/556 |
| 6,084,583 A * | 7/2000 | Gerszberg | G06Q 30/02 345/211 |
| 6,199,754 B1 * | 3/2001 | Epstein | G06Q 20/1085 235/379 |
| 6,840,441 B2 * | 1/2005 | Monaghan | G06Q 20/18 235/375 |
| 8,346,663 B2 | 1/2013 | Kawan | |
| 8,924,293 B1 | 12/2014 | Kawan | |
| 2011/0173121 A1 | 7/2011 | Kawan | |

FOREIGN PATENT DOCUMENTS

| | | | |
|---|---|---|---|
| WO | WO 98/01905 | 1/1998 | ........... G06K 19/077 |
| WO | WO 98/25371 | 6/1998 | ............. G06Q 20/00 |

* cited by examiner

METHOD AND SYSTEM OF CONTACTLESS INTERFACING FOR SMART CARD BANKING

CROSS-REFERENCE TO RELATED APPLICATIONS

This application is a continuation of U.S. patent application Ser. No. 09/238,995, filed Jan. 28, 1999, now U.S. Pat. No. 8,346,663 and titled "METHOD AND SYSTEM OF CONTACTLESS INTERFACING FOR SMART CARD BANKING," which claims priority to U.S. Provisional Application No. 60/073,091, which was filed Jan. 30, 1998. The entire contents of each document are incorporated by reference herein.

FIELD OF THE INVENTION

The present invention relates generally to the field of smart cards, and more particularly to a method and system of smart card banking using a contactless interface between the smart card and a financial institution banking system.

BACKGROUND

The use of smart card technology in the consumer environment places a high physical demand on the devices. In order to be considered practical, they must be able to withstand significant wear and tear. The current use of devices with, for example, metallic contacts for the interface, involves significant physical limitations, such as cables and connections, and such devices are especially susceptible to physical wear and tear. Thus, there is a need for a method and system of smart card banking, which utilizes a contactless interface to establish a communications link between the smart card and the banking institution, and which minimizes wear and tear on the interfacing devices and maximizes durability of such devices.

SUMMARY OF THE INVENTION

It is a feature and advantage of the present invention to provide a method and system of smart card banking utilizing a contactless interface to establish a communications link for bi-directional flow of data between the smart card and a banking institution, which provides all the benefits of contact interface without the physical limitations of the contacts and without any significant increase in cost.

It is a further feature and advantage of the present invention to provide a method and system of smart card banking using a contactless communications interface to increase durability.

It is an additional feature and advantage of the present invention to provide a method and system of smart card banking utilizing a contactless interface to improve ease-of-use and to eliminate the need, for example, for cables and connections.

To achieve the stated and other features, advantages and objects of the present invention, an embodiment of the invention provides a method and system of smart card banking utilizing a contactless interface. According to an embodiment of the invention, a contactless communication is initiated for a smart card user between a smart card application residing, for example, on a smart card microcomputer and the on-line system, for example, of a financial institution, such as a bank. The system verifies authorization for the communication, and once the authorization is verified, information can be communicated for the user to the on-line system. The contactless communication is initiated by initiating a contactless communication interface, such as an infrared communication interface or a wireless or radio frequency communication interface, including, for example, a proximity communication interface.

In an embodiment of the present invention, the contactless communication is initiated, for example, at a terminal, such as an automated teller machine, a personal computer, or a land or wireless telephone, through a contactless communication transceiver of the terminal, such as an infrared transceiver or a wireless or radio frequency transceiver, including, for example, a proximity transceiver. The contactless communication is initiated between the contactless communication transceiver of the terminal and a contactless communication transceiver of a personal data assistant, such as an electronic purse or wallet. Further, the process of initiating the contactless communication also involves, for example, initiating a physical contact communication between the smart card imbedded with a smart card microcomputer, on which the smart card application resides, and the personal data assistant, such as the electronic purse or wallet, which includes a card reader. In an alternate embodiment of the present invention, the smart card is provided with a contactless communication interface transceiver, such as an infrared transceiver or a wireless or radio frequency transceiver, including, for example, a proximity transceiver, and the contactless communication is initiated directly between the smart card contactless communication interface transceiver and the contactless communication interface transceiver of the terminal.

In an embodiment of the present invention, the authorization for the communication is verified, for example, by one or both of the personal data assistant, such as the electronic purse, and the on-line terminal, such as the automated teller machine, the personal computer, or the telephone. The authorization verification involves, for example, verifying the authenticity of the smart card and checking security information for the user, such as the user's PIN number or biometric information, such as the user's fingerprint. The security information is received by the system through an input/output device of the personal data assistant or the terminal. Once the authorization is verified, information can then be communicated for the user to the on-line system, likewise by inputting the information through the input/output device of the personal data assistant or the terminal.

Additional objects, advantages and novel features of the invention will be set forth in part in the description which follows, and in part become more apparent to those skilled in the art upon examination of the following or may be learned by practice of the invention.

DETAILED DESCRIPTION OF THE INVENTION

Figure 1:
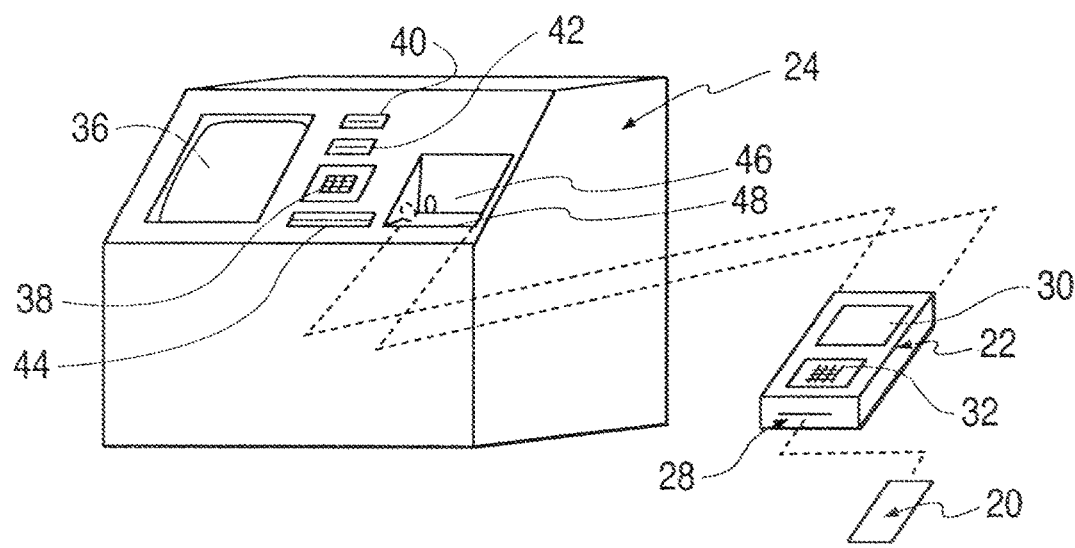
FIG. 1 depicts samples of key hardware components for an embodiment of the present invention.

Referring now in detail to an embodiment of the present invention, an example of which is illustrated in the accompanying drawings, FIG. 1 illustrates samples of hardware components for an embodiment of the present invention. The hardware components include, for example, a smart card 20 in the form of a credit card-sized plastic card with a microcomputer having memory to set up and securely store data. A personal data assistant (PDA) 22 provides a physical interface with smart card 20 in order to exchange information and perform transactions. Personal data assistant 22 is, for example, an electronic purse or wallet, or any other alphanumeric input/output and display device able to provide a conduit between smart card 20 and a financial institution, such as through an automated teller machine (ATM) 24. Automated teller machine 24 is, for example, a device capable of verifying and authorizing smart card 20 and performing financial institution and other similar data exchange transactions.

Figure 2:
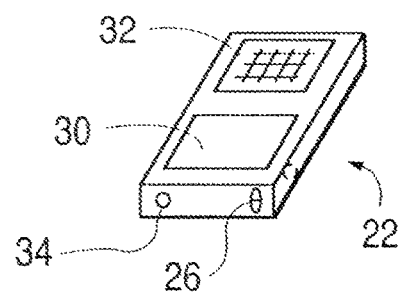
FIG. 2 depicts and provides further detail regarding the personal data assistant hardware component for an embodiment of the present invention.

FIG. 2 provides further detail regarding the personal data assistant hardware component for an embodiment of the present invention. Personal data assistant 22 includes, for example, a contactless communications interface 26 for input and output of data, such as an infrared (IR) emitter and sensor. The IR interface enables fast data transfer rates, such as 100 kilobits/second, while providing a large emitter target area that allows for some misalignment between the communicating devices, such as personal data assistant 22 and automated teller machine 24. While the example embodiment depicted in the drawings utilizes an IR interface, it will be appreciated that other contactless interfaces, such as wireless technologies or proximity-type technologies, can likewise be successfully utilized for an embodiment of the present invention. Additionally, the personal data assistant 22 may also be provided, for example, with ports 34 for direct communications links, such as by connecting wires or cables between devices. This redundant communications capability advantageously increases the utility of the personal data assistant 22, so that it can interact, for example, with more data transfer devices.

In an embodiment of the present invention, personal data assistant 22 also includes a smart card reader 28 communicating with smart card 20. Smart card 20 is inserted into smart card reader 28 of personal data assistant 22, which verifies the smart card. The verification process involves, for example, checking security information, such as a personal identification number (PIN) or biometric information of the user of the smart card 20. Personal data assistant 22 is also provided with a display 30 and an alphanumeric keypad 32, or other similar input/output means, for viewing, inputting, and manipulating this information and other data.

In an embodiment of the present invention, personal data assistant 22 performs transactions with the smart card 20 and has memory in which it is capable of storing various information and programs. Depending on the configuration of the personal data assistant 22, the memory capacity can be, for example, 16 megabytes or more. Further, the personal data assistant 22 is enabled, for example, by its own power source, such as a battery. Alternative power source configurations for the personal data assistant 22 include, for example, direct connections to external power supplies or contactless connections, such as with magnetic field-induced voltage.

In an embodiment of the present invention, personal data assistant 22 communicates with automated teller machine 24 through the contactless communications interface 26. Automated teller machine 24 includes, for example, a display 36, an alphanumeric keypad 38 or other similar input/output means, a printer with printer output 40, a card reader 42, and a money dispenser 44. The personal data assistant 22 is aligned with contactless communications interface 46 on automated teller machine 24, for example, by placing the personal data assistant on a ledge or shelf 48. Shelf 48, or other equivalent structure, is configured such that it guides the contactless communications interface 26 on personal data assistant 22 into substantial alignment with the contactless communications interface 46 on automated teller machine 24. While in the embodiment example depicted in the drawings, interface 46 utilizes IR interface contactless communications technology with an IR emitter and sensor, it will be appreciated that other contactless interfaces, such as wireless technologies or proximity-type technologies, can likewise be successfully used for an embodiment of the present invention.

Figure 3:
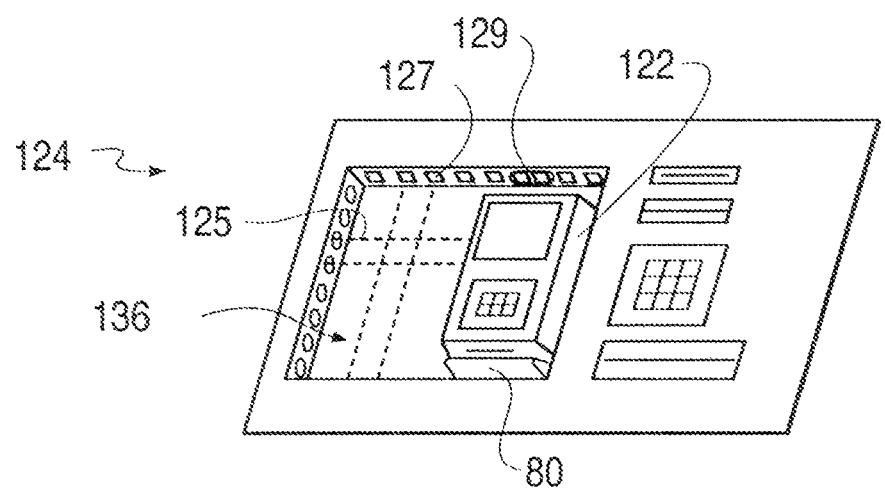
FIGS. 3-4 illustrate key hardware components for an alternate embodiment of the present invention.
Figure 4:
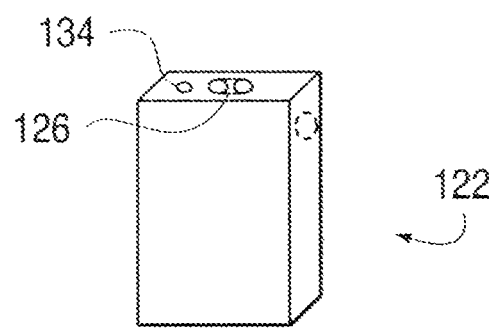

FIGS. 3-4 illustrate key hardware components for an alternate embodiment of the present invention. In an alternate embodiment of the invention, the hardware components include a personal data assistant 122 placed directly on display or IR touch screen 136 of automated teller machine 124. In this embodiment, personal data assistant 122 includes contactless communications interface 126 disposed on the end of the personal data assistant. It will be appreciated by those skilled in the art that other placements of interface 126, such as on a side of personal data assistant 122, are equally feasible. Further, the personal data assistant 122 includes a port 134 for direct communications links, such as by connecting wires or cables between devices.

In an embodiment of the present invention, IR touch screen 136 includes sets of IR emitters 125 on one side that correspond to sets of IR sensors 127 on the opposite side. This arrangement of emitters 125 and sensors 127 essentially divides display 136 into a grid, wherein a position on the grid may be determined by the intersection of perpendicular pairs of emitters and sensors, as illustrated by the dotted lines in FIG. 3. Thus, for a successful communication to occur, a proper alignment of personal data assistant 122 within the grid framework is required.

Referring to FIG. 3 for an embodiment of the present invention, display 136 further includes a custom touch screen having a set IR emitter/sensor pair 129 in substantial alignment for communication with communications interface 126 on the end of the personal data assistant 122 with the proper positioning of the personal data assistant. There are numerous ways to insure proper positioning of personal data assistant 122, such as by providing markings on the surface of display 136, markings on the face of automated teller machine 124 adjacent display 136, and by providing built-in structure on the face of automated teller machine 124 to limit the positioning of personal data assistant 122. For example, if the touch screen is not oriented horizontally or at a low angle, then support 80 may be required to hold personal data assistant 122 in position on the touch screen. Other configurations will be obvious to those skilled in the art. In this manner, communications interface 126 on personal data assistant 22 interacts directly with emitter/sensor pair 129 of display 136.

Figure 5:
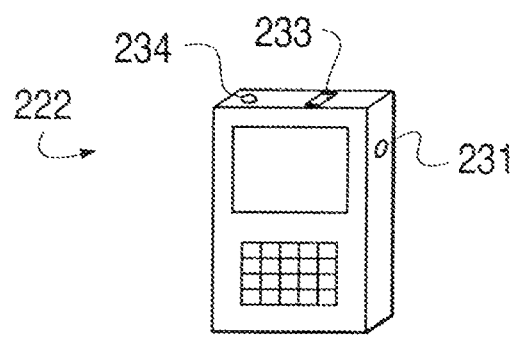
FIGS. 5-6 illustrate key hardware components for another alternate embodiment of the present invention.
Figure 6:
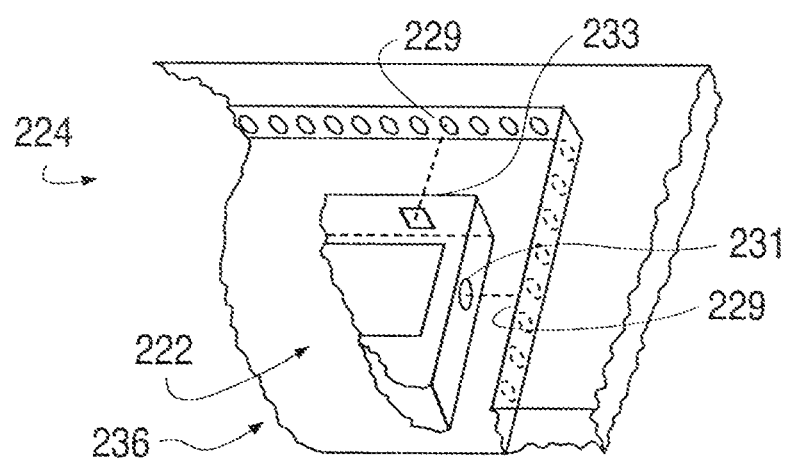

FIGS. 5-6 illustrate key hardware components for another alternate embodiment of the present invention. For example, in such alternate embodiment of the present invention, personal data assistant 222 includes a single IR emitter 231 on one side and a single IR sensor 233 on an adjacent side. Further, personal data assistant 222 includes port 234 for direct communications links, such as by connecting wires or cables between devices. When personal data assistant 222 is placed on IR touch screen or display 236 of automated teller machine 224, single emitter 231 substantially aligns with a corresponding sensor 229 and, similarly, sensor 233 is in substantial alignment with corresponding emitter 229. Thus, personal data assistant 222 is able to communicate with automated teller machine 224.

Figure 7:
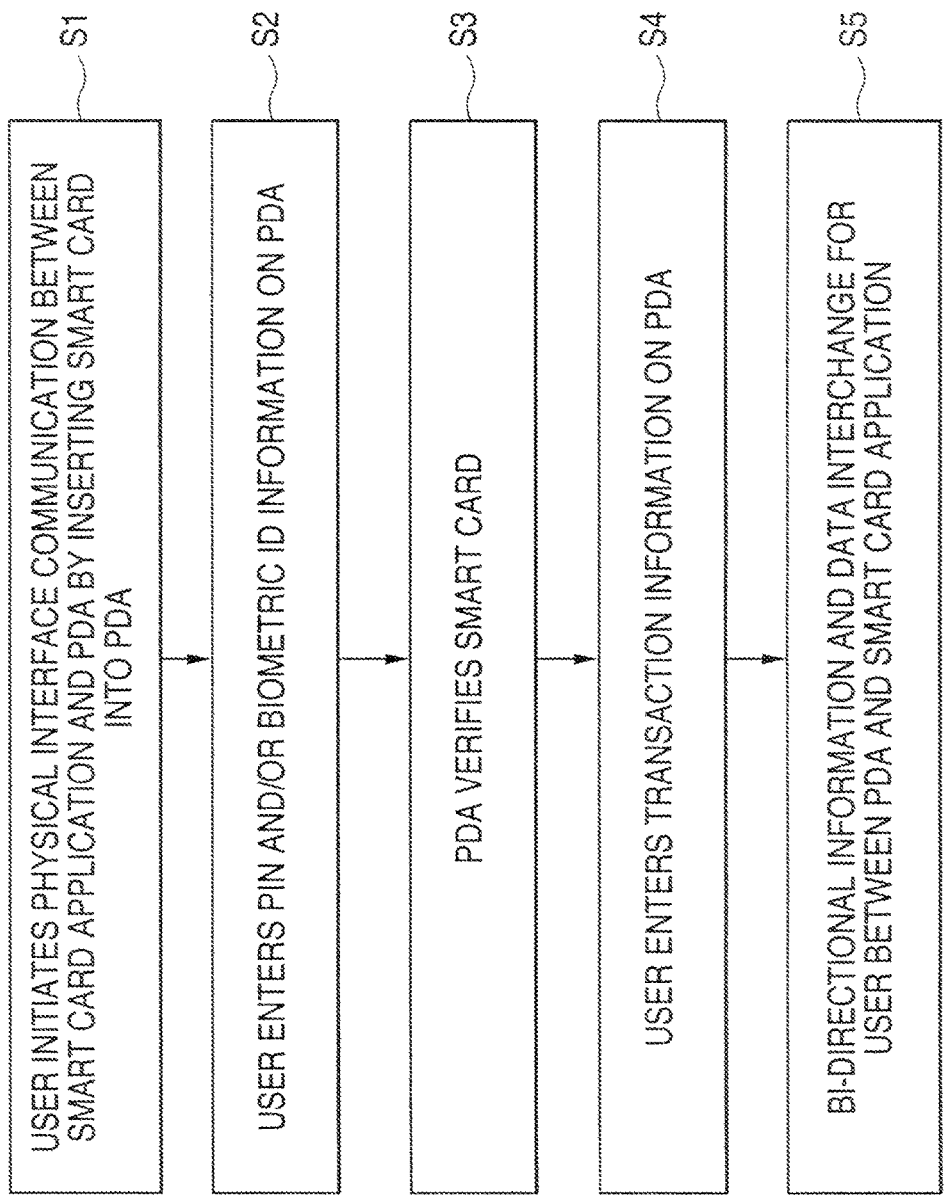
FIG. 7 is a schematic flow chart which illustrates an example of the process of loading a smart card into a personal data assistant for an embodiment of the present invention.

FIG. 7 is a schematic flow chart with illustrates an example of the process of loading a smart card into a personal data assistant for an embodiment of the present invention. For example, at S1, a smart card 20 is inserted into a personal data assistant 22 or, for example, an electronic wallet or purse. At S2, personal data assistant 22, or the wallet or purse, performs a verification process. This process validates smart card 22 and involves security checks, which consist, for example, of the entering one or both of a secret PIN number and biometric information, such as finger prints for the user. Once smart card 20 is validated, then at S3, transactions between personal data assistant 22 and the smart card 20 may occur. Thus a user can control the transactions through input/output means, such as keypad 32, on the personal data assistant 22 and can view information on the display 30. The types of transactions that the user can perform include, for example, loading or unloading phone numbers and addresses, updating stocks, performing financial transactions and checking balances. Thus, information and data can be exchanged between the smart card 20 and the personal data assistant 22, and the information on the smart card can be viewed on the personal data assistant.

Figure 8:
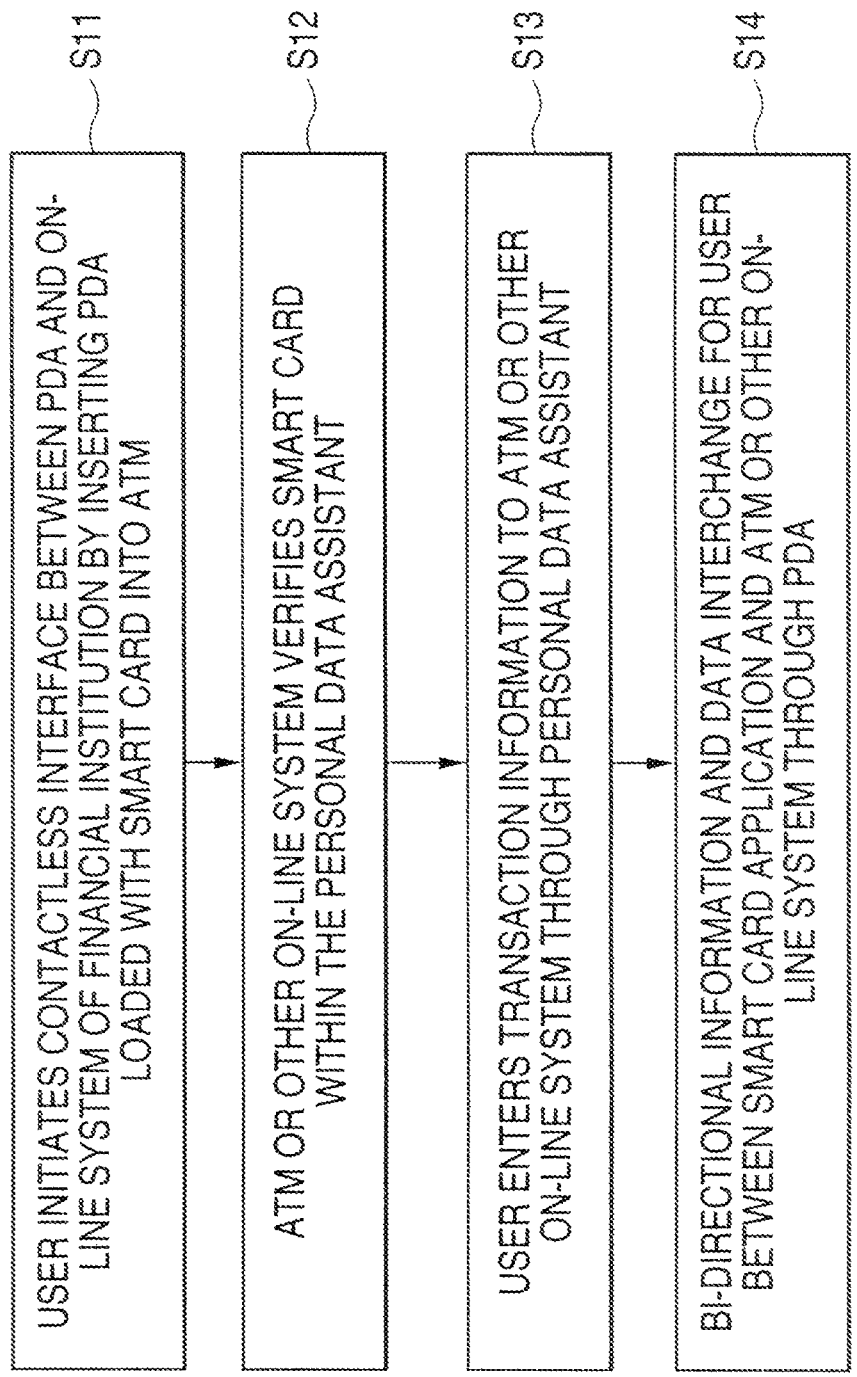
FIG. 8 is a schematic flow chart which illustrates an example of the process of a contactless interface transaction between the smart card loaded in the personal data assistant with the smart card loaded and an automated teller machine for an embodiment of the present invention.

FIG. 8 is a schematic flow chart which illustrates an example of a contactless transaction between the smart card loaded in the personal data assistant and an automated teller machine for an embodiment of the present invention. Once smart card 20 is loaded in personal data assistant 22, the personal data assistant loaded with the smart card can then be used to perform transactions with an on-line system, such as a financial institution. At S11, the IR capability of the personal data assistant enables a contactless communication interface to be established between the personal data assistant 22 and the on-line system. As shown in FIGS. 1, 3, and 6, this interface can include aligning the personal data assistant on the automated teller machine 24, 124, or 224 with a corresponding IR interface. Alternatively, the interface can consist of aligning the IR interface on the personal data assistant with a corresponding IR interface on a phone, cell phone, computer or other similar devices capable of performing transactions.

In an embodiment of the present invention, the contactless interface advantageously allows the user to quickly establish contact, for example, with automated teller machine 24, 124, or 224 without worrying about connecting cables or aligning the devices precisely. When the personal data assistant establishes communications with the automated teller machine, for example, an authorization and verification process begins. At S12, the automated teller machine 24 or on-line system verifies the smart card 20 within the personal data assistant 22. The user may be required to input information, such as a PIN or biometric information. Upon completing the verification, the user can then perform transactions with the on-line system through the personal data assistant 22, at S13. For example, the user can have a pre-loaded program that skips the typical selection screens on the automated teller machine 24 and directly performs a specified transaction. At S14, such transactions may include, for example, loading value on the smart card 20, making investments, loading or unloading data such as addresses, phone numbers or stock information, and many other similar transactions.

In an embodiment of the present invention, it is to be recognized that an important feature of a smart card is the ability to authenticate the physical card. The smart card with account and/or security information is used in the opening of a transaction to identify the user's account and, through the authentication of encrypted security information, to verify that the particular card is authentic. In order to verify that it is the correct user that is submitting or using the smart card, the secret PIN number and/or biometric information is sent with the card during the start of a transaction. The secret PIN number and/or biometric information, such as the user's fingerprint, is always encrypted for external transmission. Alternatively, to provide a further level of security, the entered PIN number and/or biometric information can be used to unlock the smart card to enable the card to communicate its information. If the personal data assistant or other smart card-accepting device has the required security, both the secret PIN number and the biometric information, along with the card information, can be stored, for example, for a one-time use or for multiple uses, depending on the level of security required. This can occur, for example, on an automated teller machine or where a normal contact interface smart card would be slow to execute a transaction, such as a with a personal data assistant which has the contactless interface capability, for example, with a prepackaged transaction.

Figure 9:
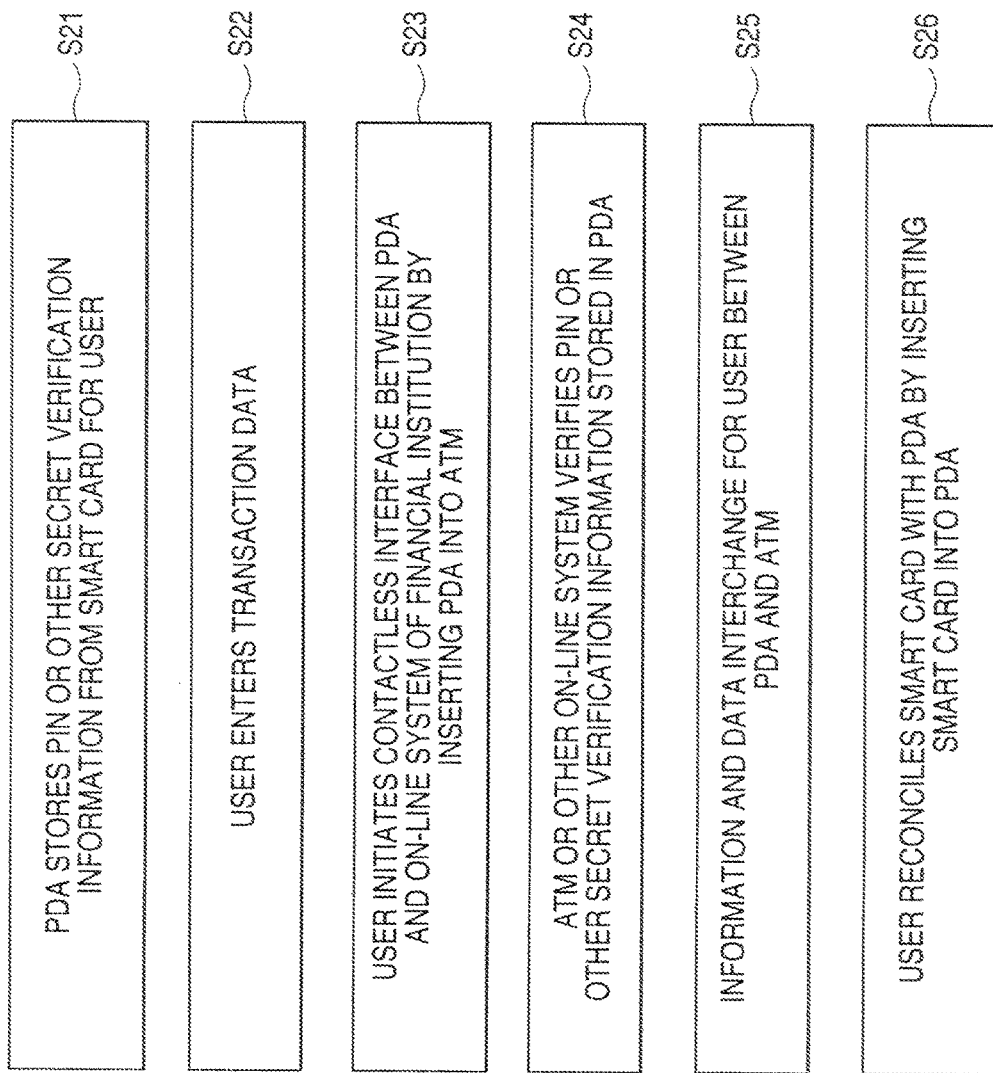
FIG. 9 is a schematic flow chart which illustrates an example of the process of a contactless interface transaction in which the personal data assistant communicates directly with the automated teller machine without the smart card for an embodiment of the present invention.

In an alternate embodiment of the present invention, the personal data assistant 22 may communicate directly, for example, with the automated teller machine 24 or financial institution without having the smart card 20 loaded in the personal data assistant. FIG. 9 is a schematic flow chart with illustrates an example of the process of a contactless transaction in which the personal data assistant communicates directly with an automated teller machine without the smart card. For example, at S21, the personal data assistant 22 stores the secret verification information that is contained on the smart card 20. This process requires a very high level of security for the personal data assistant 22, as a higher level of security is generally required for a smart card as opposed to a personal data assistant. In this case, the user can, for example, perform transactions separately, between the smart card 20 and the personal data assistant 22 and between the personal data assistant and the automated teller machine 24. For example, at S22, the user enters the transaction to the personal data assistant. At S23, the user initiates the contactless interface between the personal data assistant and the on-line system of the financial institution by inserting the personal data assistant into the automated teller machine. At S25, information and data are interchanged for the user between the personal data assistant and the automated teller machine. At S26, the transactions then need to be reconciled on the smart card 20 or the automated teller machine 24.

Figure 10:
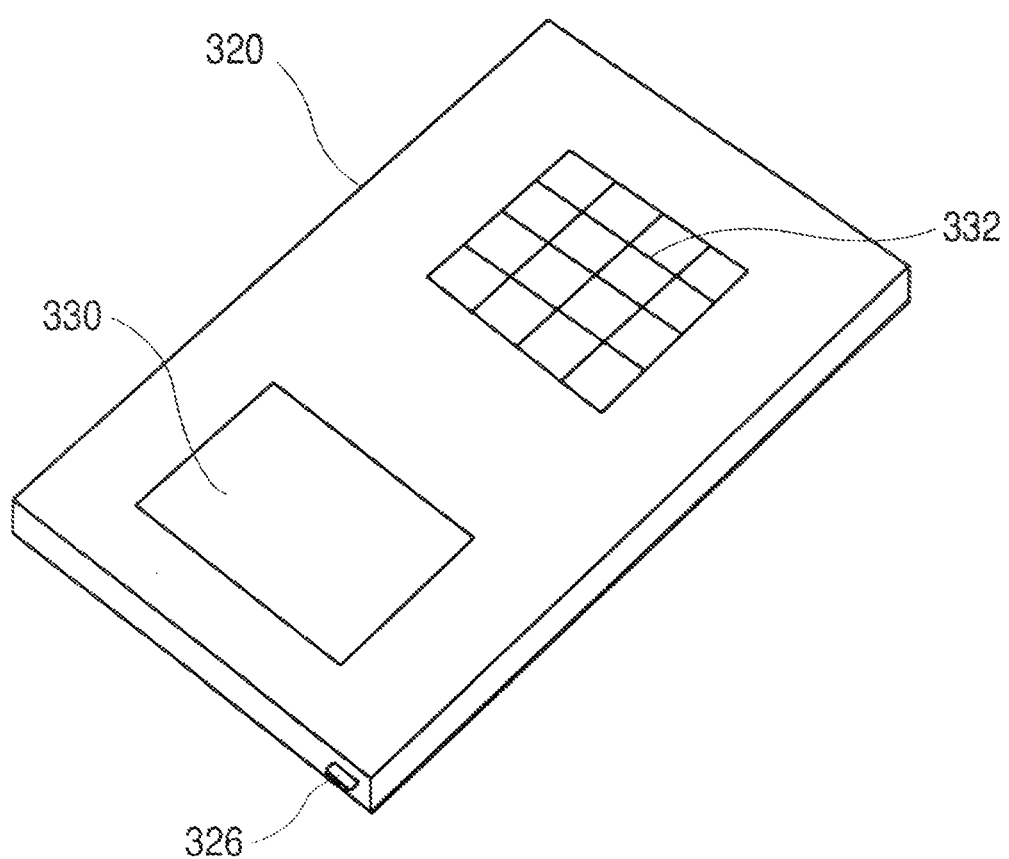
FIG. 10 shows a smart card hardware component for an additional alternate embodiment of the present invention.

FIG. 10 provides further detail regarding a smart card for an additional alternate embodiment of the present invention. In the additional alternate embodiment, the smart card 320 has, for example, an alphanumeric input/output keypad 332, a display 330, and an IR communications interface 326. Smart card 320 is also provided with sufficient memory to perform various financial transactions. Thus, in such an embodiment, the smart card 320 communicates directly with the financial institution through the IR interface 326, for example, through an automated teller machine, a phone, a cell phone, a computer, or other similar device with corresponding IR interface, and the user may view and manipulate the transactions.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of operating an automated teller machine, the method comprising:
   receiving, by the automated teller machine and from a portable device carried by a user, verification information received from the portable device upon the portable device being placed in alignment with an emitter of the automated teller machine;
   determining, by the automated teller machine, whether the verification information received from the portable device carried by the user is valid;
   receiving, by the automated teller machine and from the portable device carried by the user, a request to conduct a financial transaction at the automated teller machine, wherein the user enters the request on the portable device; and
   upon receiving the request from the portable device placed in alignment with the emitter of the automated teller machine and being verified when the verification information is received from the portable device is valid, activating, by the automated teller machine, a money dispenser associated with the automated teller machine in response to the request to conduct the financial transaction and without displaying every selection screen on a user interface of the automated teller machine that is used when the financial transaction is conducted on the automated teller machine without the portable device.

2. A method according to claim 1, wherein the verification information is stored on the portable device.

3. A method according to claim 1, wherein the automated teller machine does not comprise a screen or a keyboard.

4. A method according to claim 1, wherein the verification information comprises a personal identification number (PIN).

5. A method according to claim 1, wherein the verification information comprises biometric information.

6. The method according to claim 1, further comprising inserting a smart card into the portable device such that the smart card may be updated with information about the financial transaction.

7. The method according to claim 1, wherein the automated teller machine receives the information about a financial transaction through a wireless connection between the automated teller machine and the portable device.

8. The method according to claim 1, wherein the verification information received from the portable device is inputted by a user into the portable device.

9. A method of operating an automated teller machine to conduct a financial transaction, the method comprising:
   initiating communication between a portable device of a user and the automated teller machine upon the portable device being placed in alignment with an emitter of the automated teller machine;
   receiving, by the automated teller machine, verification information transmitted from the portable device;
   verifying, by either the automated teller machine or a financial institution connected to the automated teller machine, the verification information;
   receiving, by the automated teller machine, a request to conduct the financial transaction from the portable device; and
   upon receiving the request from the portable device placed in alignment with the emitter of the automated teller machine and being verified when the verification information is received from the portable device is valid, activating, by the automated teller machine, a money dispenser associated with the automated teller machine, in response to the request to conduct the financial transaction and without displaying every selection screen on a user interface of the automated teller machine that is used when the financial transaction is conducted on the automated teller machine without the portable device.

10. The method according to claim 9, wherein the portable device comprises an input/output means.

11. The method according to claim 9, wherein the automated teller machine does not comprise a keypad or a screen.

12. The method according to claim 9, wherein the verification information comprises biometric information.

13. The method according to claim 9, wherein the verification information comprises a personal identification number (PIN).

14. The method according to claim 9, further comprising inserting a smart card into the portable device such that the portable device may act as a conduit between the smart card and the automated teller machine.

15. The method according to claim 14, wherein the smart card is verified by the financial transaction terminal or financial institution connected to the automated teller machine.

16. An automated teller machine for enabling a user to conduct a financial transaction, the automated teller machine comprising:
   a connection to a financial institution that is operable to execute the financial transaction;
   a communication port that is operable to transmit and/or receive financial transaction information to and/or from a portable device of the user upon the portable device being place in alignment with an emitter of the automated teller machine;
   a dispenser through which cash can be dispensed during the financial transaction; and
   a user interface configured to display a first set of selection screens when the financial transaction is conducted without the portable device and a second set of selection screens when the financial transaction is conducted with the portable device, wherein the second set of selection screens has fewer selection screens than the first set of selection screens;

wherein the dispenser is activated, by the automated teller machine, upon receiving the request from the portable device placed in alignment with the emitter of the automated teller machine and when verification information received from the portable device is determined to be valid, wherein the activation of the dispenser is in response to the request to conduct the financial transaction received from the portable device, wherein the activation of the dispenser comprises displaying the second set of selection screen comprising fewer selection screens than the first set of selection screens.

17. The financial transaction terminal according to claim 16, wherein the automated teller machine is operable in a first mode in which the automated teller machine customer can enter information using the user interface located on the automated teller machine, and in a second mode in which the automated teller machine customer can enter information using an input/output means of the portable device.

18. The automated teller machine according to claim 16, wherein the automated teller machine user interface provides no keypad to the user and provides no display to the user.

19. The automated teller machine according to claim 16, wherein the communication port is operable to transmit and/or receive verification information of a user such that the financial transaction terminal and/or the financial institution can authorize the financial transaction.

20. The automated teller machine according to claim 19, wherein the verification information is stored on the portable device.

21. The automated teller machine according to claim 16, wherein the portable device has a smart card inserted therein.

* * * * *